(12) United States Patent
Nagakura et al.

(10) Patent No.: US 7,906,926 B2
(45) Date of Patent: Mar. 15, 2011

(54) DOOR DRIVE CONTROL APPARATUS AND DOOR DRIVE CONTROL METHOD

(75) Inventors: Takayuki Nagakura, Hachioji (JP); Yoshinobu Sato, Hachioji (JP); Akira Fujimori, Hachioji (JP); Naoki Takeda, Kodaira (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 456 days.

(21) Appl. No.: 12/078,606

(22) Filed: Apr. 2, 2008

(65) Prior Publication Data

US 2008/0258665 A1    Oct. 23, 2008

(30) Foreign Application Priority Data

Apr. 20, 2007  (JP) .................... 2007-111488

(51) Int. Cl.
*H02P 7/00* (2006.01)
(52) U.S. Cl. ........ 318/434; 318/445; 318/452; 318/453; 318/461
(58) Field of Classification Search .............. 318/434, 318/445, 452, 453, 461
See application file for complete search history.

(56) References Cited

U.S. PATENT DOCUMENTS

| | | | | |
|---|---|---|---|---|
| 5,587,566 A * | 12/1996 | Barten et al. | ........ | 187/316 |
| 6,859,139 B1 * | 2/2005 | Sato | ........ | 340/542 |
| 2004/0251868 A1 * | 12/2004 | Sato et al. | ........ | 318/652 |
| 2005/0102903 A1 * | 5/2005 | Takahashi | ........ | 49/28 |
| 2005/0151495 A1 * | 7/2005 | Miyauchi | ........ | 318/469 |
| 2005/0269984 A1 * | 12/2005 | Piechowiak et al. | ........ | 318/445 |
| 2007/0016332 A1 * | 1/2007 | Tyni et al. | ........ | 700/275 |

FOREIGN PATENT DOCUMENTS

| | | | |
|---|---|---|---|
| JP | 2002106254 A | * | 4/2002 |
| JP | 2006-158009 | | 6/2006 |
| JP | 2007290834 A | * | 11/2007 |

OTHER PUBLICATIONS

Machine traslation of JP 2006-158009 A.*

* cited by examiner

*Primary Examiner* — Walter Benson
*Assistant Examiner* — Kawing Chan
(74) *Attorney, Agent, or Firm* — Rabin & Berdo, PC

(57) ABSTRACT

A door drive control apparatus capable of an accurate detection, without misidentifying an inverse overrun condition, and a door drive control method that improves safety. The door drive control apparatus includes a power converter that supplies power to a door drive linear motor, and operates the power converter by feedback control using a speed detection value and a speed command value of the door, and controls a speed of the door. The door drive control apparatus includes a speed trouble determiner, which outputs a door inverse direction speed trouble signal in the event that the speed command value of the door exceeds either a positive or negative first setting speed, and the speed detection value exceeds a second setting speed of a polarity opposite to that of the speed command value.

14 Claims, 9 Drawing Sheets

DOOR DRIVE CONTROL APPARATUS AND DOOR DRIVE CONTROL METHOD

BACKGROUND OF THE INVENTION

1. Technical Field

The present invention relates to a door drive control apparatus and door drive control method for driving, for example, a train carriage door, at a predetermined speed, by means of a motor operated by a power converter.

2. Related Art

To date, when driving a door using a synchronous motor, a method has been known in which a position detector detects a polar position of the synchronous motor, calculates a speed from the detected polar position, and controls the speed of the synchronous motor. According to this method, where, for some reason, the actual polar position and the polar position information used for control are misaligned (referred to as a polar position misalignment), it can happen that abnormal situations occur, such as lack of thrust with respect to a door speed command value, stopping of the door, or overrun of the door in a direction opposite to the movement direction commanded by the speed command value (referred to as an inverse overrun). A known countermeasure to these kinds of abnormal situations is described in the door opening and closing apparatus of JP 2006-158009-A (paragraphs [0020] to [0025] and [0028] to [0033], FIGS. 1 to 4 etc.).

In the door opening and closing apparatus described in JP 2006-158009-A, inverse overrun is determined to be when a speed detection value of the synchronous motor exceeds a first setting value of a polarity opposite to that of the speed command value. A description is given of short circuiting an armature coil of the synchronous motor by means of a switch, and applying braking to the door, or short circuiting the motor armature coil by activating all switching elements of an upper arm or lower arm of a power converter, which drives the synchronous motor, making an output voltage zero (a zero voltage output), and applying braking to the door. A description is also given of carrying out a braking operation of the door until the speed of the door drops as far as or below a second setting value. By means of the heretofore described countermeasure, even in the event that the door falls into the inverse overrun condition due to polar position misalignment, this is detected immediately, and the door is safely stopped.

Normally, with a train carriage door drive control apparatus, in the event that a passenger or obstruction is caught in the door at the time of a closing operation, the door is caused to carry out a reopening and closing operation in order to free the object caught in the door. FIG. 9 shows a relationship between the speed command value and the speed detection value when the door is caused to carry out an opening operation again (the so-called reopening and closing operation), because an obstacle has come in contact with the door at the time of the door closing operation. In the reopening and closing operation, as the door is opened by switching the door speed command value from a closing direction to an opening direction, and subsequently, the door is closed by switching from the opening direction to the closing direction, the polarity of the speed command value changes, as shown in FIG. 9. At this time, as the door operates with a slight time lag with respect to the speed command value, a condition occurs in which the polarity of the speed command value and the polarity of the speed detection value become reversed, as shown at c in FIG. 9.

With the heretofore known technology of JP 2006-158009-A, when an overrun determination speed (the heretofore described first setting value) is set low for safety reasons, the condition in which the polarity of the speed command value and the polarity of the speed detection value become reversed at a time of the reopening and closing operation is misidentified as an inverse overrun condition. As a result thereof, it can happen that, even though it is a normal operation, the door is braked and stopped by carrying out the braking operation for an inverse overrun.

Further, when a passenger who runs onto the train lays a hand on a closing door, while the polarity of the speed command value is a polarity which closes the door, the polarity of the speed detection value is a polarity which opens the door. Consequently, in this case too, even though it is a normal operation, as the control apparatus misidentifies it as an inverse overrun, it applies braking and stops the door.

When, by so doing, the door stops and fails to close in this way, as the train starts moving after a member of staff has checked and locked the door, although there is no problem from a safety aspect, there has been a problem in that it interferes with the train's schedule.

Also, in the known technology of JP 2006-158009-A, as heretofore described, a technology is disclosed whereby, in the event of an actual inverse overrun of the door due to the polar position misalignment or the like, the door is braked by means of the zero voltage output. However, when the door overruns in the opening direction and, being unable to stop before a fully open position, bounces back from the fully open position, the speed detection value becomes zero at an instant in which the door bounces back from the fully open position. At this time, as the control apparatus stops the zero voltage output of the power converter, the power converter is gated off, and the motor falls into a free running condition. Consequently, a delay occurs in a braking of the motor, and there is a danger of the passenger being caught in the door and injured.

Furthermore, when an erroneous position detection value is input into the control apparatus due to a failure of a polar position detector, as a result of which the control apparatus misidentifies the inverse overrun condition, this causes the following kind of problem. That is, as this is not a case in which the door is actually overrunning, even though the power converter outputs the zero voltage, the control apparatus continues to misidentify an inverse overrun condition. As a result thereof, as the power converter will continue to output the zero voltage indefinitely, there has also been a problem in that a specific switching element becomes fixed in either an on condition or an off condition, causing an advancement in a depreciation of an instrument.

SUMMARY OF THE INVENTION

Herein, an object of the invention is to provide a door drive control apparatus capable of accurate detection, without misidentifying an inverse overrun condition. Also, an object is to provide a drive control apparatus such as prevents a depreciation of an instrument. Furthermore, another object of the invention is to provide a door drive control method which, as well as increasing safety with respect to that to date, does not interfere with a schedule of a train or the like.

In order to achieve the heretofore described objects, a door drive control apparatus according an embodiment of the invention includes a power converter operated by means of feedback control using a speed detection value and a speed command value of a door, and a motor such as a door drive linear motor, to which power is supplied from the power converter. This is configured to control a speed of the door via the motor, by controlling the power converter. To describe this in more detail, the door drive control apparatus includes a trouble determiner that, in the event that the door speed command value exceeds either a positive or negative first setting speed, and the speed detection value exceeds a second setting speed of a polarity opposite to that of the speed command value, determines it to be an inverse overrun condition, and outputs a door speed trouble signal. It is possible to calculate the speed detection value from a door position detection value. Also, the speed trouble signal can be used for, for example, applying braking to the motor by controlling an output voltage of the power converter at zero.

A more specific configuration of the above door drive control apparatus includes a speed controller which calculates a current command value in such a way that the door speed detection value matches the speed command value, and a current controller which generates a voltage command value of the power converter, using the current command value, an output current detection value of the power converter, and a position detection value of the door. Furthermore, it is possible to generate the voltage command value of the power converter for applying braking to the motor by inputting the speed trouble signal into the current controller.

A door drive control apparatus according to a further embodiment of the invention includes a power converter operated by feedback control using a speed detection value and a speed command value of a door, and a motor such as a door drive linear motor, to which power is supplied from the power converter. A configuration is such as to control a speed of the door via the motor, by controlling the power converter. Also, the door drive control apparatus includes an acceleration calculator which calculates an acceleration of the door using the speed detection value, and a trouble determiner which predicts a speed of the door after a predetermined time, from an acceleration detection value and the speed detection value and, in the event that the predicted speed exceeds either a positive or negative third setting speed, outputs a predicted door speed trouble signal. The predicted speed trouble signal can be used, in the same way as above, for applying braking to the motor by controlling an output voltage of the power converter at zero.

A specific configuration of the door drive control apparatus includes a speed controller that calculates a current command value in such a way that the speed detection value matches the speed command value, and a current controller that generates a voltage command value of the power converter, using the current command value, an output current detection value of the power converter, and a position detection value of the door. Also, it is possible to generate the voltage command value of the power converter for applying braking to the motor by inputting the predicted speed trouble signal into the current controller.

A door drive control method according to a further embodiment of the invention, executed by the door drive control apparatus, operates a power converter by means of feedback control using a speed detection value and a speed command value of a door, and controls the speed of the door driven by a motor such as a linear motor. The door drive control method carries out a trouble detection operation which determines that the door is in an inverse overrun condition in the event that the door speed command value exceeds either a positive or negative first setting speed, and the speed detection value exceeds a second setting speed of a polarity opposite to that of the speed command value, and outputs a door speed trouble signal, and controls an operation of the power converter using the speed trouble signal. According to the door drive control method, as the trouble detection operation is not carried out in the event that the door speed command value does not exceed the first setting speed, it is possible to reduce a danger of a misidentification of an inverse overrun of the door.

A door drive control method according to yet a further embodiment of the invention carries out a trouble detection operation which predicts a speed of a door after a predetermined time, for example, a few seconds, from an acceleration detection value calculated from a door speed detection value, and the speed detection value and, in the event that the predicted speed exceeds either a positive or negative third setting speed, determines that there is trouble, and outputs a predicted speed trouble signal. Then, the operation of a power converter is controlled using the predicted speed trouble signal. According to this door drive control method, as the predicted door speed after the predetermined time elapses is used in the trouble detection operation, unlike a simple detection operation arising from an excess speed, it is possible to detect the overrun condition at a stage before the door reaches a dangerous speed as a result of the overrun.

In a door drive control method according to still another embodiment of the invention, when the speed trouble signal or the predicted speed trouble signal is outputted, an output voltage of the power converter becomes zero for a certain period, short circuits an armature coil of the motor, and applies braking to the door by a so-called power generation brake. For this reason, even when the door overruns in an opening direction and, being unable to stop before a fully open position, bounces back from the fully open position, there is no occurrence of a phenomenon whereby a free running condition due to a power converter zero voltage output and gating off arises. Consequently, it is possible to eliminate the danger of a passenger being injured due to a delay in a braking of the motor.

A door drive control method according to yet another embodiment of the invention includes executing the trouble detection operation for a certain time only after the door starts an operation, but not executing the trouble detection operations after the certain time elapses. For this reason, when, because of a replacement or the like of a door position detector, a misalignment in a polar detection position according to a detection value remains untreated, the door overrunning immediately after the operation start, it is possible to detect the overrunning within the heretofore described certain time, and take action such as braking or stopping.

Another door drive control method according to a preferred embodiment of the invention includes executing the trouble detection operation for a certain time only after the door starts an operation, but not executing the trouble detection operation after the certain time elapses, in the event that a difference between the speed command value and the speed detection value is within a threshold value. That is, when a polar position misalignment is small, and the speed detection value does not increase far enough for it to be determined that there has been an overrun within the heretofore described certain time, in the event that, subsequently, the speed detection value does not comply with the speed command value, due to the difference between the speed command value and the speed detection value not coming within the threshold value, it being possible to pick up a portent of the overrun, it is possible to reliably detect the overrun.

With a door drive control method according to yet another embodiment, the trouble detection operations are switched between and executed, depending on whether it is a regular operation time or an inspection and servicing operations time. Although there is a danger of misidentifying as an inverse overrun at the inspection and servicing operations time, it is possible to reliably detect the inverse overrun even at low speed. Also, at the regular operation time, it is possible, while ensuring safety, to reduce the danger of misidentifying an inverse overrun, by a trouble detection operation focused on a predicted door speed.

According to the invention, it is possible, when the polar position misalignment occurs, to accurately detect but not misidentify the inverse overrun condition. Also, it is possible to provide a door drive control apparatus and a door drive control method that, whilst increasing safety for users, do not damage instruments or interfere with services.

DESCRIPTION OF THE PREFERRED EMBODIMENTS

Figure 1:
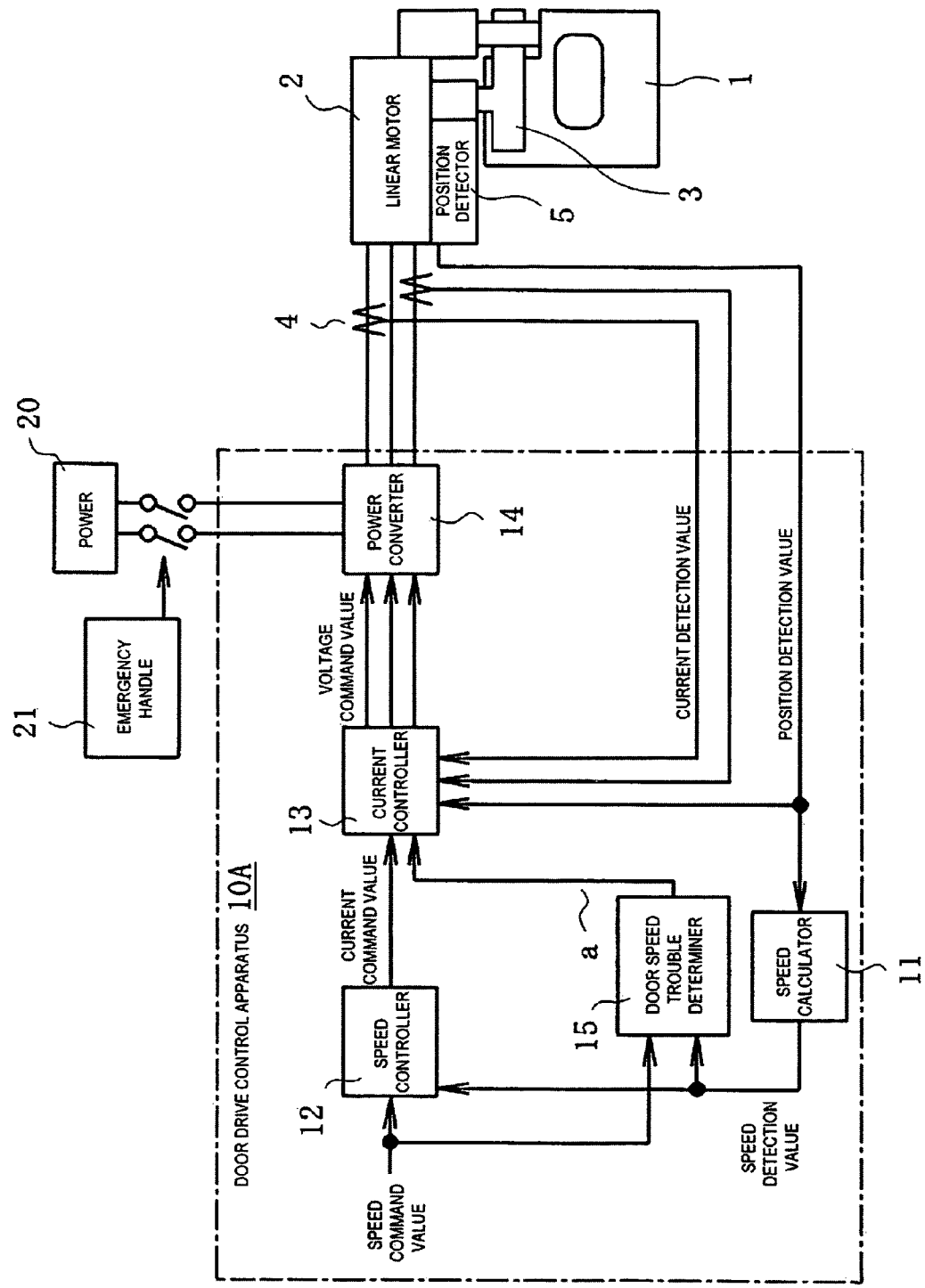
FIG. 1 is a block diagram showing a first embodiment of a door drive control apparatus of the invention.

Hereafter, a detailed description will be given, while referring to the drawings, of preferred embodiments of the invention. Firstly, FIG. 1 is a block diagram showing a first embodiment of a door drive control apparatus.

In FIG. 1, reference numeral 1 indicates a door, which is coupled to a door drive linear motor 2 via a coupler 3. The linear motor 2 is connected to a door drive control apparatus 10A. A position of the door 1 is detected by a position detector 5. Also, a two phase (for example, a U phase and a W phase) output current of a power converter 14, to be described hereafter, provided inside the door drive control apparatus 10A is detected by an output current detector 4.

The door drive control apparatus 10A includes a speed calculator 11, a speed controller 12, a current controller 13, the power converter 14, and a door speed trouble determiner 15. The speed calculator 11 calculates a speed of the door 1, using a position detection value output from the position detector 5, and outputs it as a speed detection value. In the speed controller 12, a feedback control of the speed is carried out using a speed command value and the speed detection value, and a current command value is calculated and outputted.

The speed command value and the speed detection value are also input into the door speed trouble determiner 15. The door speed trouble determiner 15 generates a door inverse direction speed trouble signal a, based on the speed command value and the speed detection value, and transmits it to the current controller 13. A description of a detailed operation of the door speed trouble determiner 15 will be given hereafter.

The current controller 13 carries out feedback control of a current using the current command value, a current detection value and a position detection value, calculates a voltage command value, and outputs it. The voltage command value is given to the power converter 14. The power converter 14 carries out a power conversion operation by means of an on/off action of an internal switching element, supplies a voltage as per the voltage command value to the linear motor 2, and drives the linear motor 2. The power converter 14 is configured in such a way as to, being cut off from power 20 by an operation of an emergency handle 21, make an emergency stop.

Next, a description will be given of a first embodiment of a door drive control method which uses the door drive control apparatus 10A of FIG. 1, using the flowchart of FIG. 2. The first embodiment, a feature of which being a detection operation of a reverse overrun condition of the door 1, is executed by the door speed trouble determiner 15 in FIG. 1. Herein, taking a polarity of a speed of an opening-direction of the door 1 as positive, and a polarity of a speed of a closing direction of the door 1 as negative, a setting speed 1 (a first setting speed), and a setting speed 2 (a second setting speed) in FIG. 2 are taken to be speeds expressed by absolute values set in advance.

Figure 2:
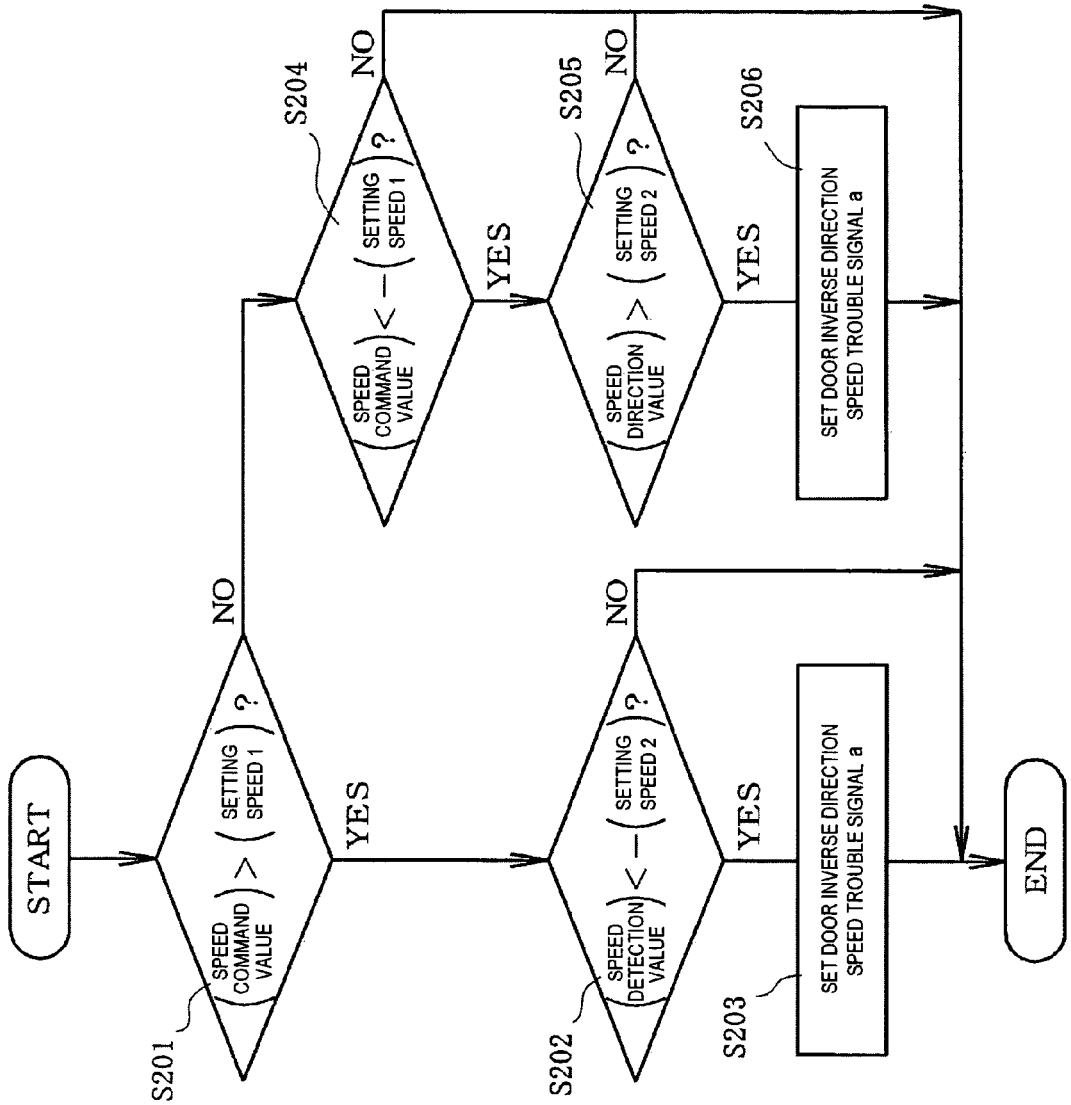
FIG. 2 is a flowchart showing a first embodiment of a door drive control method of the invention.

In FIG. 2, in the event that the speed control value exceeds a positive setting speed 1 (step S201, Yes), the process shifts to step S202. In step S202, it is determined whether or not the speed detection value is less than a negative setting speed 2, which is of a reverse polarity to that of the speed command value and, if the speed detection value is less than the negative setting speed 2 (step S202, Yes), it is determined that the door 1 is in a reverse overrun condition, and a door inverse direction speed trouble signal a is set (step S203). If the speed detection value is not less than the negative setting speed 2 (step S202, No), the process is finished. That is, even though the speed command value is given in the polarity of opening the door 1, when the speed detection value is of the polarity of closing the door 1, and less than the setting speed 2, the door inverse direction speed trouble signal a is set.

Also, in the event that the speed control value does not exceed the positive setting speed 1 (step S201, No), the process shifts to step S204. In step S204, it is determined whether or not the speed command value is less than a negative setting speed 1 and, if the speed command value is less than the negative setting speed 1 (step S204, Yes), the process shifts to step S205. Also, if the speed command value is not less than the negative setting speed 1 (step S204, No), the process is finished. That is, if the speed command value does not exceed the setting speed 1 in either the opening direction or the closing direction, a trouble detection operation (the detection operation of the reverse overrun condition) using the speed detection value and setting speed is not carried out.

In step S205, it is determined whether or not the speed detection value exceeds a positive setting speed 2 and, if the speed detection value exceeds the positive setting speed 2 (step S205, Yes), it is determined that the door 1 is in the reverse overrun condition, and the door inverse direction speed trouble signal a is set (step S206). If the speed detection value does not exceed the positive setting speed 2 (step S205, No), the process is finished.

The door inverse direction speed trouble signal a output from the door speed trouble determiner 15 of FIG. 1 is sent to the current controller 13. The current controller 13, when the door inverse direction speed trouble signal a is input, for example, outputs a voltage command value such as makes an output voltage of the power converter 14 zero.

Figure 9:
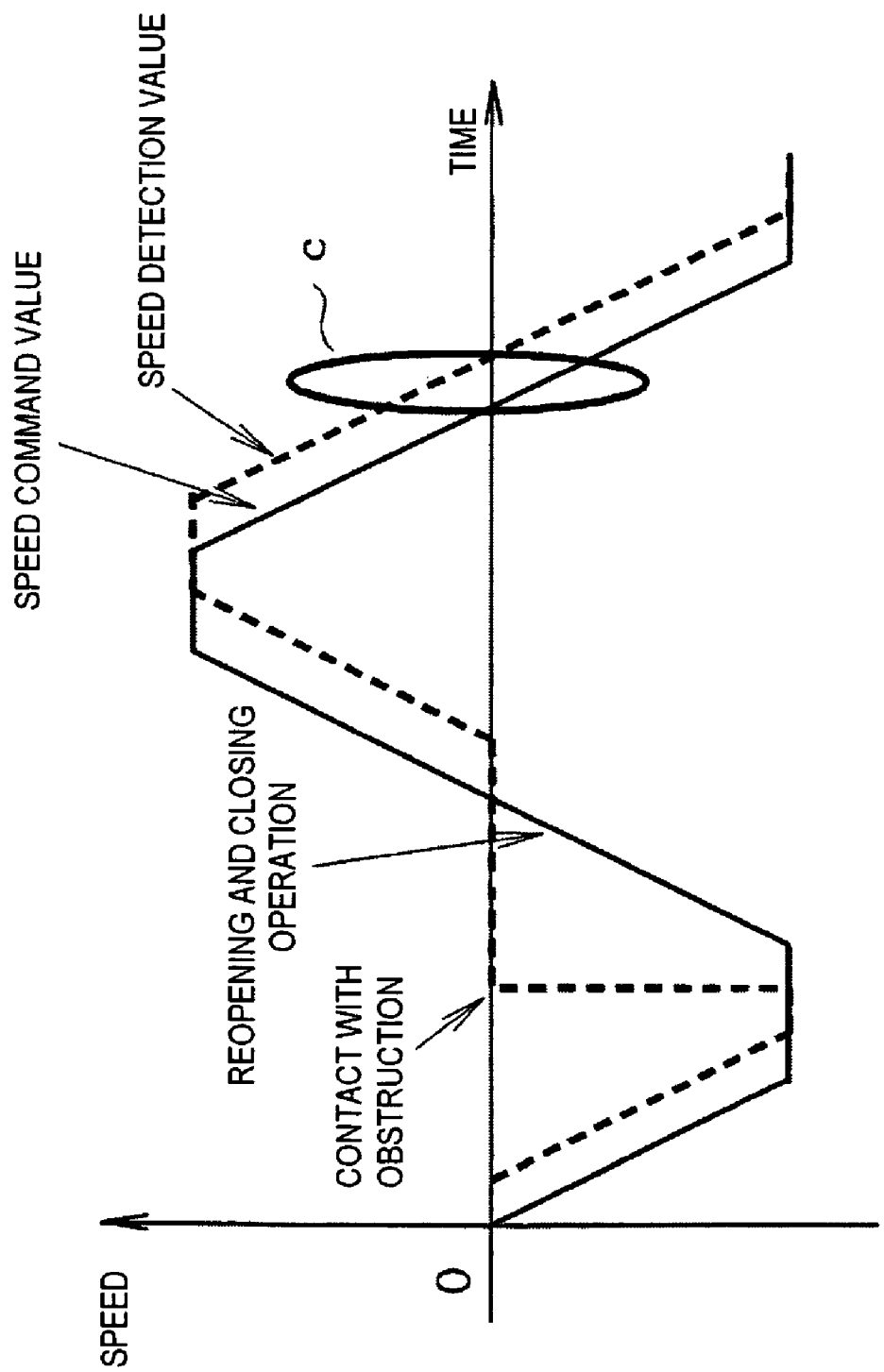
FIG. 9 is a diagram showing a relationship between a speed command value and a speed detection value at a door reopening and closing operation time.

By means of the heretofore described kinds of operation, according to the embodiment, there is no danger of misidentifying the reverse overrun condition due to the kind of discrepancy in polarities of the speed command value and speed detection value shown in FIG. 9. That is, with the operations of FIG. 2, the trouble detection operation is not carried out when the speed command value does not exceed the positive or negative setting speed 1. In other words, the trouble detection operation is carried out only in the event that the speed command value exceeds either the positive or negative setting speed 1. To summarize, as long as the setting speed 1 is set at an appropriate value, it being possible to circumvent the determination of the door inverse direction speed trouble in an area in which the polarities of the speed command value and speed detection value differ (an area c in which the speed command value is relatively small, as shown in FIG. 9), it is possible to avoid the misidentification of the reverse overrun condition.

Figure 3:
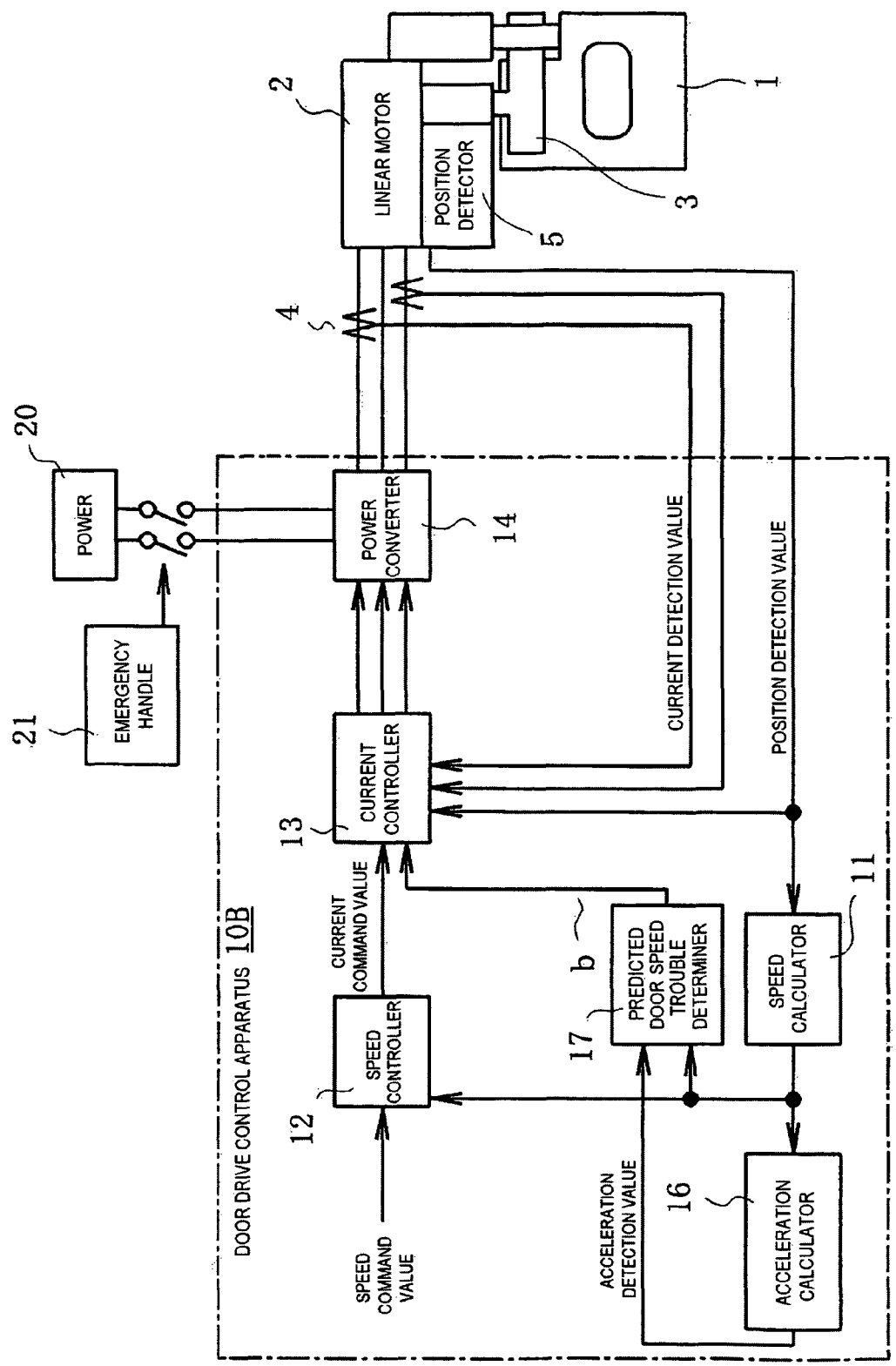
FIG. 3 is a block diagram showing a second embodiment of the door drive control apparatus of the invention.

Next, a description will be given of a second embodiment of the door drive control apparatus, using the block diagram of FIG. 3. In FIG. 3, identical numbers being affixed to components that are identical to those of FIG. 1, hereafter, a description will be given centered on portions that differ from FIG. 1.

An acceleration calculator 16, which calculates an acceleration from the speed detection value, and a predicted door speed trouble determiner 17, which detects and outputs a predicted door speed trouble signal b using an acceleration detection value and the speed detection value, are provided in a door drive control apparatus 10B of the second embodiment. Then, the predicted door speed trouble signal b is input into the current controller 13. Other configurations are identical to a portion of FIG. 1 from which the door speed trouble determiner 15 is excluded.

Continuing, a description will be given of a second embodiment of a door drive control method which uses the door drive control apparatus 10B of FIG. 3, using the flowchart of FIG. 4. The second embodiment, a feature of which being a detection operation that predicts an overrun of the door 1, is executed by the predicted door speed trouble determiner 17 in FIG. 3. Herein, a setting speed 3 in FIG. 4 being a speed expressed by an absolute value set in advance, a polarity of a speed of the opening direction of the door 1 is taken as positive, and a polarity of a speed of a closing direction of the door 1 as negative. Also, a predicted time is taken to be a time set in advance (for example, a few seconds).

Firstly, a predicted speed from the present until a point at which the predicted time elapses is calculated by means of equation 1 (S401).

Predicted speed=speed detection value+acceleration detection value×predicted time   Equation 1

Herein, the speed detection value is calculated by the speed calculator 11 of FIG. 3, and the acceleration detection value is calculated by the acceleration calculator 16.

Next, it is determined whether or not the predicted speed exceeds a positive setting speed 3 and, if it does (step S402, Yes), the predicted door speed trouble signal b is set (S403). Also, when the predicted speed does not exceed the positive setting speed 3 (step S402, No), it is determined whether or not the predicted speed is less than a negative setting speed 3 (step S404). Then, if the predicted speed is less than the negative setting speed 3 (step S404, Yes), the predicted door speed trouble signal b is set (step S405). If the predicted speed is not less than the negative setting speed 3 (S404, No), the process is finished.

Figure 4:
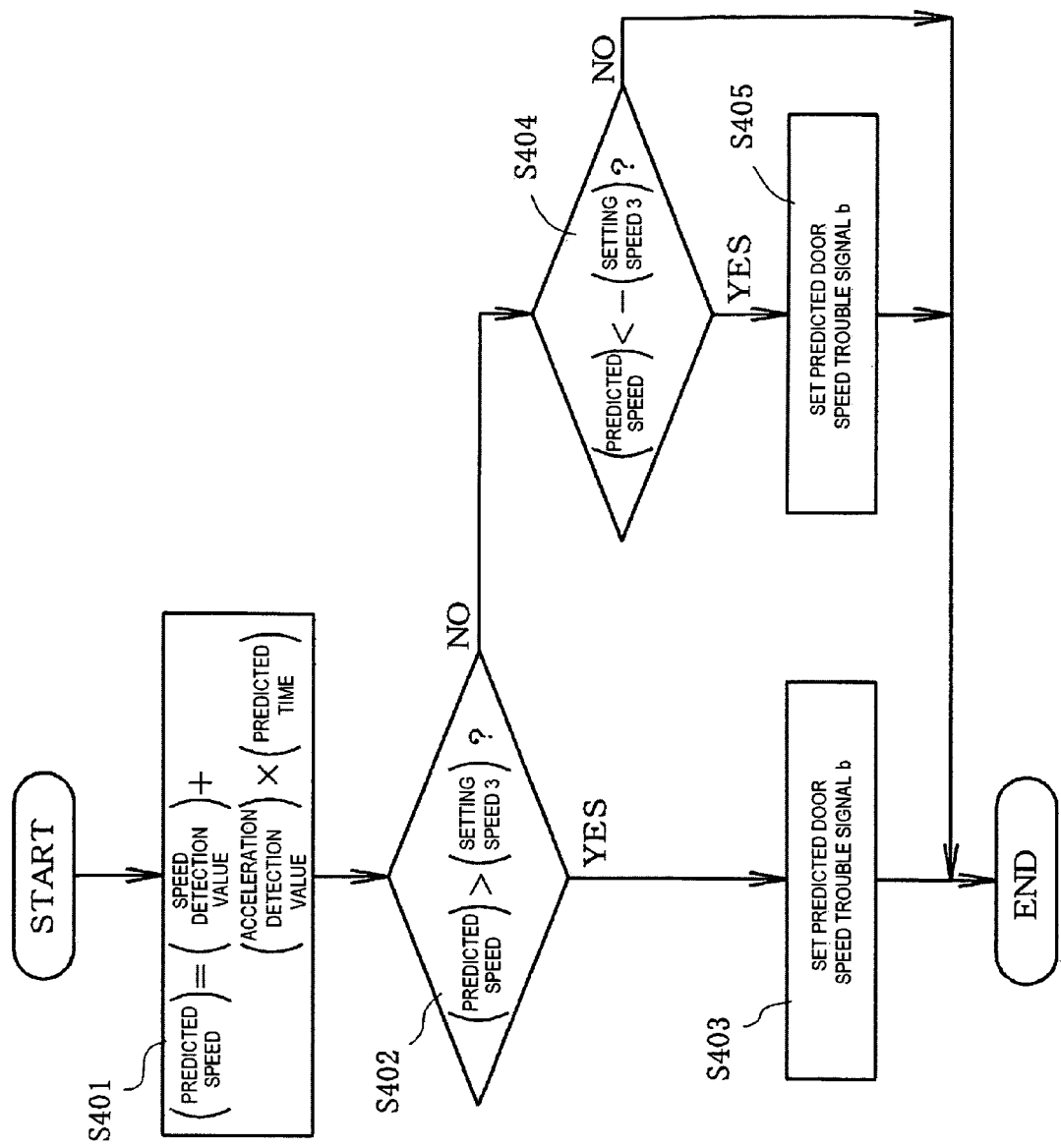
FIG. 4 is a flowchart showing a second embodiment of the door drive control method of the invention.

That is, in FIG. 4, it is arranged in such a way that the predicted door speed trouble signal b is set in the event that the predicted speed exceeds either the positive or negative setting speed 3. The predicted door speed trouble signal b is sent to the current controller 13, as shown in FIG. 3. The current controller 13, when the predicted door speed trouble signal b is input, for example, outputs a voltage command value such as to make the output voltage of the power converter 14 zero.

In the previously described operations of FIG. 2, in the event that a passenger lays a hand on the closing door 1, thereby opening the door 1, as a result of which the polarity of the speed command value and the polarity of the speed detection value differ, it is difficult to discriminate this kind of normal operation from a real inverse overrun condition. The reason is that, in the event that the passenger lays a hand on the closing door 1, thereby opening the door 1, the speed detection value in step S205 of FIG. 2 exceeds the setting speed 2, the determination result becomes "Yes" and, it is misidentified as the inverse overrun condition, and the door inverse direction speed trouble signal a is set. Although, in order to prevent misidentifying the inverse overrun condition in this case, it is sufficient to make the setting speed 2 higher, doing so creates a problem of a trade-off whereby, in a case in which the door 1 has actually overrun too, it is not possible to stop the overrun until the setting speed 2 is exceeded.

As opposed to this, according to the operations of FIG. 4 in the second embodiment, unlike the first embodiment, the polarities of the speed command value and speed detection value are not taken into consideration, meaning that the heretofore described problem does not occur. Also, for example, by using a predicted speed of a few seconds ahead, unlike a simple excess speed detection method, which determines whether or not the speed detection value has exceeded the setting speed, there is an advantage of being able to detect the overrun condition at a stage before an overrunning door reaches a dangerous speed.

Next, a description will be given of a third embodiment of the door drive control method which uses the door drive control apparatus 10A of FIG. 1, using the flowchart of FIG. 5. The third embodiment is for causing the power converter 14 to carry out the zero voltage output, by means of the current controller 13 of FIG. 1, when the inverse overrun condition of the door 1 is detected. The third embodiment can also be realized as a door drive control method that uses the door drive control apparatus 10B of FIG. 3. In this case, it is sufficient to replace the door inverse direction speed trouble signal a in FIG. 5 with the predicted door speed trouble signal b.

Figure 5:
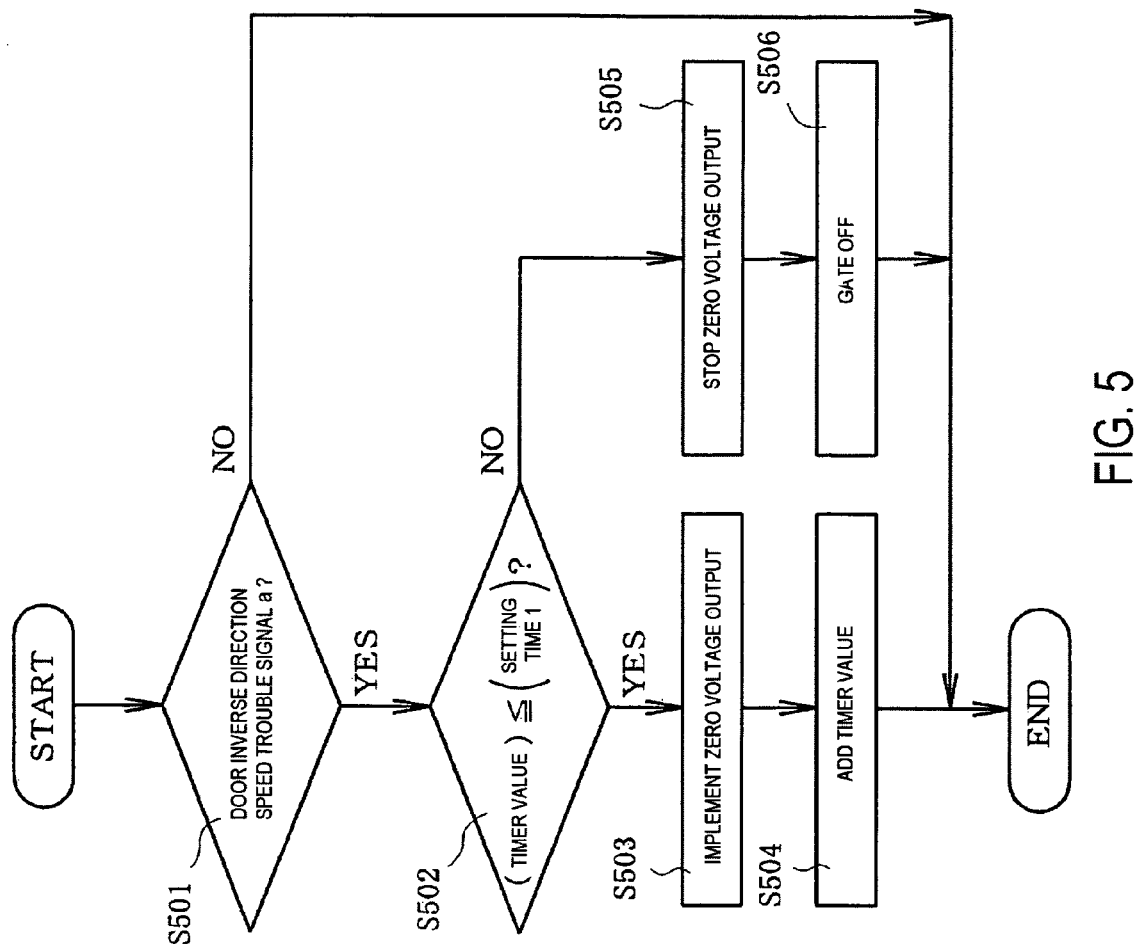
FIG. 5 is a flowchart showing a third embodiment of the door drive control method of the invention.

In FIG. 5, firstly, the current controller 13 of FIG. 1 determines existence or otherwise of the door inverse direction speed trouble signal a (step S501). If it detects that the door inverse direction speed trouble signal a (step S501, Yes) exists, the current controller 13 starts a measurement of time by means of a timer, and determines whether or not the time measured (hereafter referred to as a timer value) is within a setting time 1 (step S502). If the door inverse direction speed trouble signal a has not been output (S501, No), the current controller 13 finishes the process.

Until the timer value reaches the setting time 1 (step S502, Yes), the current controller 13 outputs a voltage command value such as to make an output voltage of the power converter 14 zero, and implements a zero voltage output (step S503). This zero voltage output can be realized by turning on all switching elements of an upper arm or lower arm that configure the power converter 14. After that, the current controller 13 adds the timer value, that is, it continues the time measurement operation (step S504). Also, if the timer value has exceeded the setting time 1 (step S502, No), the current controller 13 stops the zero voltage output (step S505), and outputs a command value such as gates off the power converter 14 (step S506).

In this way, in the third embodiment of the door drive control method, in the event that the current controller 13 detects the inverse overrun of the door 1 by means of the door inverse direction speed trouble signal a, it applies braking to the door 1 by implementing the zero voltage output for the duration of the setting time 1, regardless of the speed of the door 1. For this reason, even in a case in which the door 1 overruns in the opening direction and, being unable to stop before a fully open position, bounces back from the fully open position, there is no danger of a free running condition arising due to the stopping of the zero voltage output and the gating off. That is, as it is possible to reliably apply braking to the door 1, it is possible to reduce a possibility of the passenger being trapped and injured.

Also, even in the event of a misidentification of the inverse overrun condition based on an erroneous position detection value arising from a malfunction of a position detector of the motor 2, the zero voltage output is stopped after the setting time 1 elapses. In this way, it is possible to prevent the switching elements which configure the power converter 14 from being fixed in either an on or off condition, and prevent a depreciation of an instrument.

Figure 6:
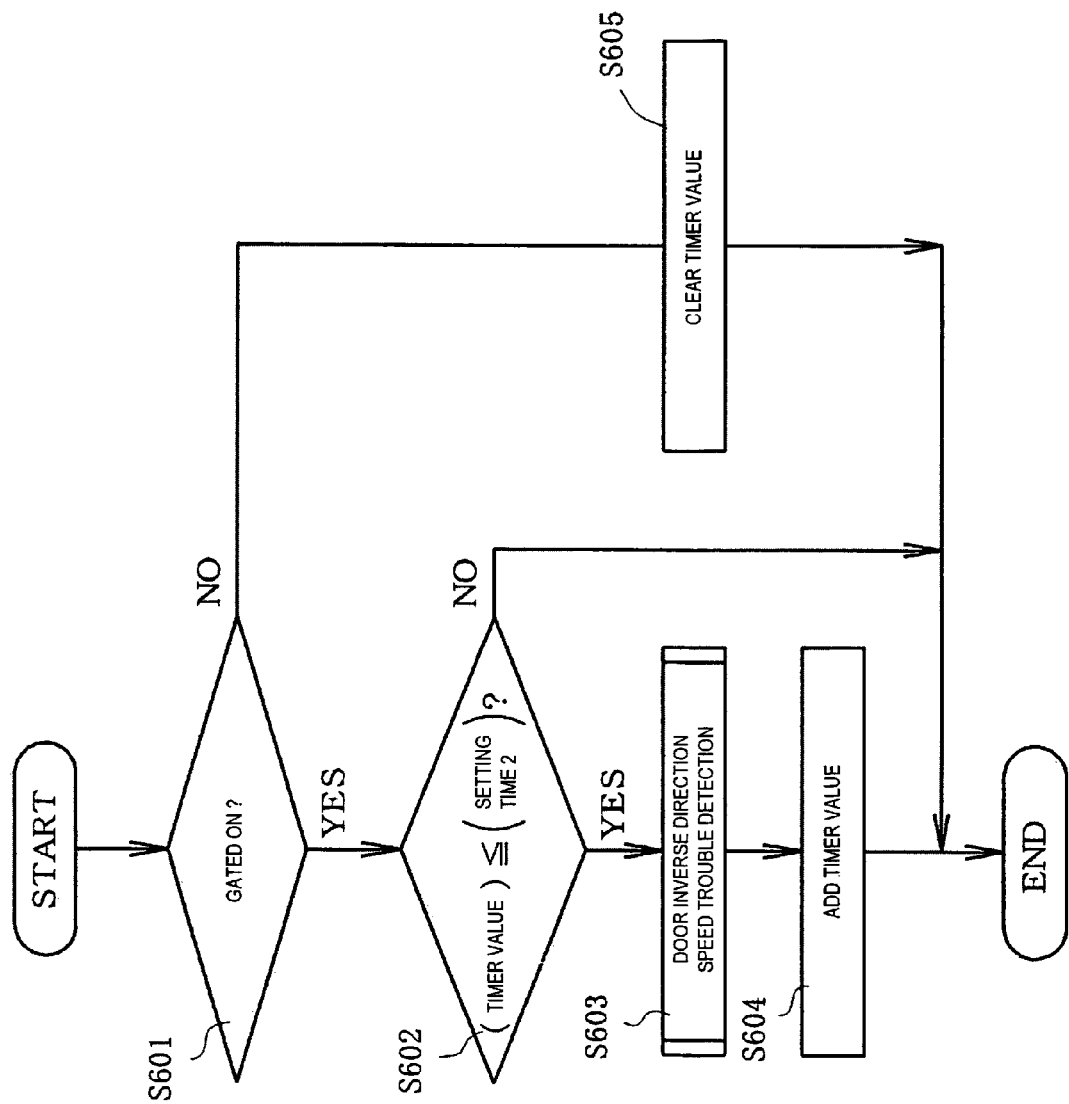
FIG. 6 is a flowchart showing a fourth embodiment of the door drive control method of the invention.

Continuing, a description will be given of a fourth embodiment of the door drive control method which uses the door drive control apparatus 10A of FIG. 1, using the flowchart of FIG. 6. This embodiment is one in which, furthermore, other process steps are added to the processes (shown as step S603 in FIG. 6) of the first embodiment shown in a whole of the flowchart of FIG. 2. The fourth embodiment can also be realized as a door drive control method that uses the door drive control apparatus 10B of FIG. 3. In this case, it is sufficient to replace step S603 in FIG. 6 with the processes of the second embodiment shown in the flowchart of FIG. 4.

Firstly, the power converter 14 in FIG. 1, being gated on during an operation of the door 1, is gated off when the door 1 reaches the fully open position, or is locked in the fully open position. For this reason, in FIG. 6, the existence or otherwise of the gating on is determined first (S601). If the power converter 14 has been gated on (step S601, Yes), the measurement of time by means of the timer is started. That is, a time elapsed from the door 1 starting the operation is measured. For a period until the timer value reaches a pre-set setting time 2 (step S602, Yes), the processes of the first embodiment shown in FIG. 2 are executed (step S603), and the timer value is added (step S604). When the timer value exceeds the setting time 2 (step S602, No), the process finishes without the processes of the first embodiment (step S603) being executed. Also, if the power converter 14 has not been gated on in step S601 (step S601, No), the timer value is cleared, and the process finishes (S605).

In this way, in the fourth embodiment, the inverse overrun detection operation, by means of the first embodiment, being carried out only for the duration of the setting time 2 after the operation start due to the gating on, the inverse overrun detection operation is not carried out after the elapsing of the setting time 2. For example, when, because of a replacement or the like of the position detector 5 in FIG. 1, a misalignment caused by the position detector 5 occurs in a polar detection position of the linear motor 2, as a result of which a polar position is not correctly reset, there is a danger of the door 1's inverse overrun immediately after the operation start. In this kind of case, it being possible, in the fourth embodiment, to detect the inverse overrun within the setting time 2, it is possible to stop the linear motor 2 safely.

Also, when acquiring a speed detection value of an direction opposite to that of the speed command value, due to a door operation by the passenger after the elapsing of the setting time 2, without detecting the inverse overrun within the setting time 2, taking it as a normal operation due to the door operation by the passenger, rather than as a polar position misalignment, it is possible to continue the operation without stopping the door 1.

Next, a description will be given of a fifth embodiment of the door drive control method which uses the door drive control apparatus 10A of FIG. 1, using the flowchart of FIG. 7. This embodiment is one in which, furthermore, other process steps are added to the processes (shown as step S706 in FIG. 7) of the first embodiment shown in the whole of the flowchart of FIG. 2. The fifth embodiment can also be realized as a door drive control method that uses the door drive control apparatus 10B of FIG. 3. In this case, it is sufficient to replace step S706 in FIG. 7 with the processes of the second embodiment shown in the whole of the flowchart of FIG. 4.

Figure 7:
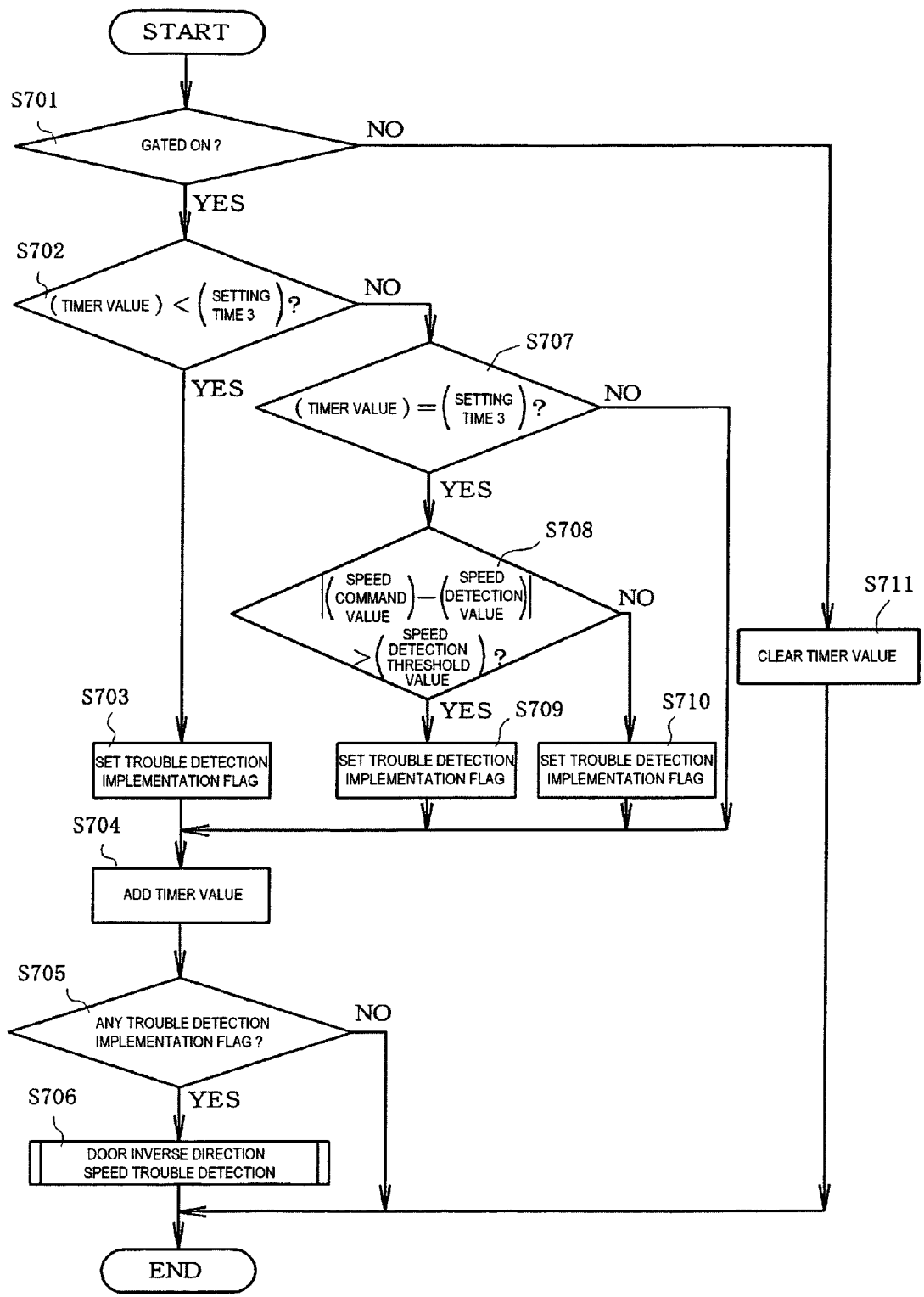
FIG. 7 is a flowchart showing a fifth embodiment of the door drive control method of the invention.

In FIG. 7, in the same way as in the fourth embodiment, an existence or otherwise of the gating on is determined first (S701) and, if the power converter 14 has been gated on (step S701, Yes), the measurement of time by means of the timer is started. That is, a time elapsed from the door 1 starting the operation is measured. Then, for a period until the timer value reaches a pre-set setting time 3 (step S702, Yes), a trouble detection implementation flag is set (step S703), and the timer value is added (step S704).

When the timer value reaches the setting time 3 (step S702, No and step S707, Yes), it is determined whether or not an equation 2 is established (step S708).

$$|(\text{speed command value}) - (\text{speed detection value})| > (\text{speed detection threshold value}) \quad \text{Equation 2}$$

Herein, the speed detection threshold value is a pre-set value.

When the equation 2 is established (step S708, Yes), the trouble detection implementation flag is set (step S709), and the timer value is added (step S704). If the condition of the equation 2 is not fulfilled (step S708, No), the trouble detection implementation flag is reset (step S710), and the timer value is added (step S704).

Furthermore, the existence or otherwise of the trouble detection implementation flag is determined (step S705) and, if the trouble detection implementation flag has been set (step S705, Yes), the processes of the first embodiment shown in FIG. 2 are executed (step S706). If the trouble detection implementation flag has not been set (step S705, No), the process finishes without the processes of the first embodiment being executed. If it is determined in step S701 that the power converter 14 has not been gated on (step S701, No), the timer value is cleared, and the process finishes (step S711).

In this way, as opposed to the heretofore described fourth embodiment, in which the door inverse direction speed trouble detection operation is carried out only for the duration of the setting speed 2 (step S603), in the fifth embodiment, as well as carrying out the door inverse direction speed trouble detection operation for the duration of the setting speed 3, after the operation start (step S706), the following processes are also carried out. That is, those processes consist of determining, when the setting time 3 has elapsed, whether the speed detection value complies with the speed command value, using the speed detection threshold value and, in accordance with a result thereof, determining an existence or otherwise of an implementation of the trouble detection operation after the elapsing of the setting time 3 (step S707 to step S710). For this reason, even in a case in which the polar position misalignment is small, and the speed detection value does not increase far enough for it to be determined that there has been the inverse overrun within the setting time 3, it is possible to pick up a portent of the inverse overrun. Then, as the inverse overrun is subsequently continuously detected, even though the setting time 3 has elapsed, it is possible to prevent a failure to detect the inverse overrun condition.

Finally, a description will be given of a sixth embodiment of the door drive control method that uses the door drive control apparatus 10A of FIG. 1 and the door drive control apparatus 10B of FIG. 3, using the flowchart of FIG. 8. When the position detector 5 is replaced during an operation such as an attachment or maintenance of the door 1 (hereafter referred to as inspection and servicing operations), it is easy to forget to correctly reset the polar position afterwards. For this reason, there is a high incidence rate of an inverse overrun due to the polar position misalignment. Also, when carrying out these operations, there is no occurrence of a problem such as a delay in running due to the stopping of the door 1, unlike during commercial service. Consequently, when carrying out the door servicing operation, and verifying an operation result, it is desirable, placing a particular emphasis on safety, to be able to detect the inverse overrun even at a low speed. The sixth embodiment, to be described hereafter, is one that takes into account the heretofore described point.

When carrying out the inspection and servicing operations on a door in, for example, a train carriage, it is normal to stop a power distribution to the linear motor 2. There is a method of stopping the power distribution to the linear motor 2, that entails cutting off the actual power 20 supplied to the power converter 14, and another method that entails cutting the power 20 off from the power converter 14 by operating the emergency handle 21 in FIGS. 1 and 3. Which of these cutting off methods has been executed can be easily distinguished by ascertaining operation condition signals of the power 20 and the emergency handle 21.

Figure 8:
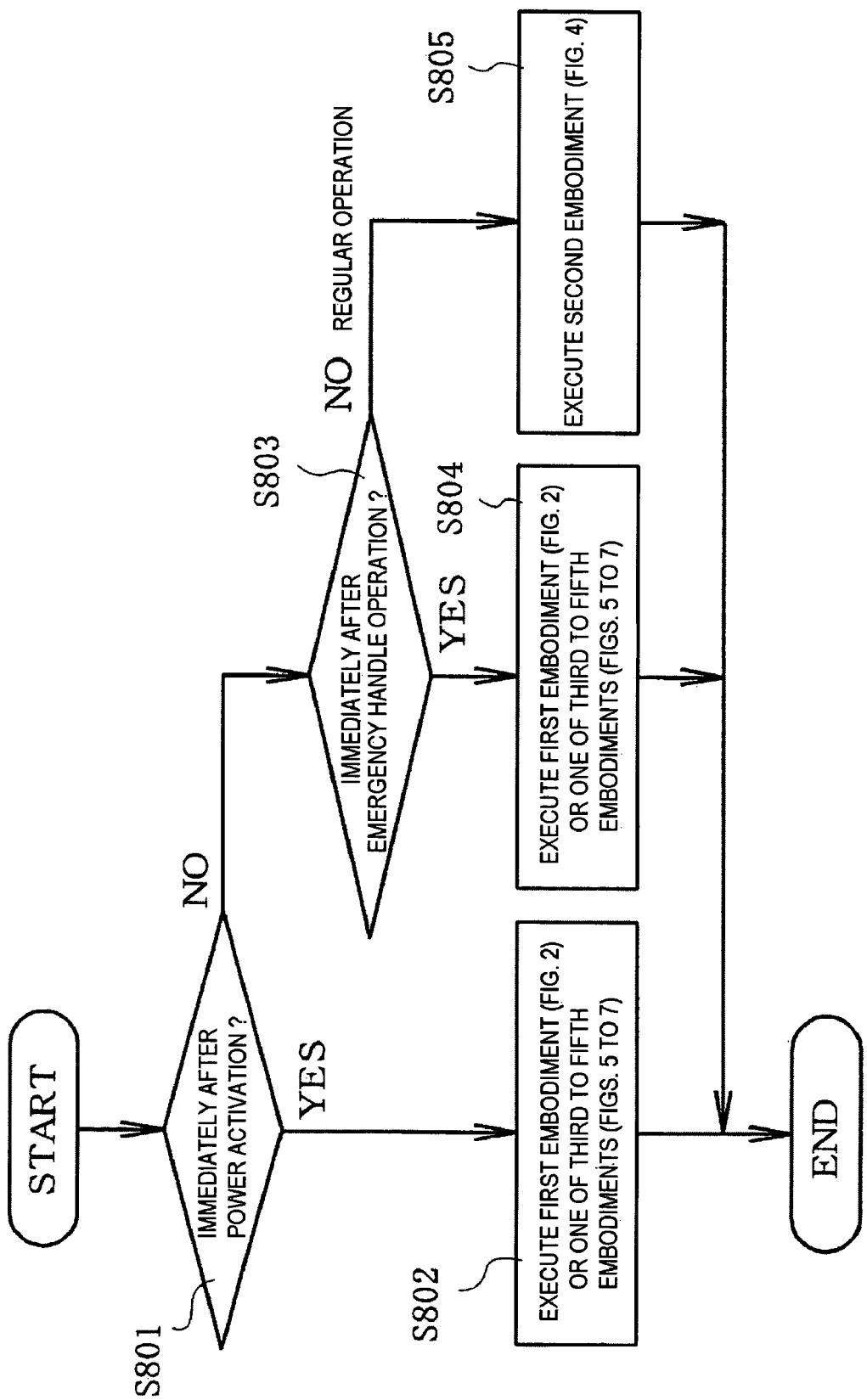
FIG. 8 is a flowchart showing a sixth embodiment of the door drive control method of the invention.

Therein, in the embodiment, in FIG. 8, it is determined whether or not the actual power 20 has been cut off, and the cutting off just been reversed (hereafter referred to as immediately after power activation) (step S801). If it is determined that it is immediately after power activation (step S801, Yes), it is determined that the power has been activated at the time of the inspection and servicing operations in order to verify the operation results, and the heretofore described first embodiment (FIG. 2), or one of the third to fifth embodiments (FIGS. 5 to 7), of the door drive control method is executed (S802). That is, a trouble detection operation using a door inverse direction speed trouble detection signal a is executed.

Also, if it is determined that it is not immediately after power activation (step S801, No), it is determined whether or not it is immediately after an operation of the emergency handle 21 (an operation cutting the power 20 off from the power converter 14 by operating the emergency handle 21, and subsequently, reconnecting the power 20 to the power converter 14) (step S803). If it is determined that it is immediately after the operation of the emergency handle 21 (step S803, Yes), in the same way as heretofore described, it is determined that the power has been activated at the time of the inspection and servicing operations in order to verify the operation results, and the first embodiment (FIG. 2), or one of the third to fifth embodiments (FIG. 5 to 7), of the door drive control method is executed (step S804). That is, the trouble detection operation using the door inverse direction speed trouble detection signal a is executed.

If it is not determined, in step S803, that it is immediately after the operation of the emergency handle 21 (step S803, No), it is determined that it is a time of a regular operation rather than the time of the inspection and servicing operations, and the heretofore described second embodiment (FIG. 4) of the door drive control method is executed (step S802). That is, a trouble detection operation using a predicted door speed trouble detection signal b is executed.

In this way, the embodiment is one which executes the trouble detection operation using the door inverse direction speed trouble detection signal a at the time of the inspection and servicing operations, and executes the trouble detection operation using the predicted door speed trouble detection signal b at the time of the regular operation. By switching between the trouble detection operations in this way, while a possibility of misidentifying as the inverse overrun is high at the time of the inspection and servicing operations, it is possible to reliably detect a real inverse overrun at the low speed. Also, at the time of the regular operation, it is possible, while ensuring the safety, to reduce a danger of misidentifying the overrun condition, and appropriately detect the real overrun condition.

What is claimed is:

1. A door drive control apparatus comprising:
    a power converter configured to supply power to a door drive motor;
    a control circuit configured to operate the power converter by feedback control using a speed detection value and a speed command value of a door, and to control a speed of the door driven by the motor; and
    a trouble determiner which outputs a speed trouble signal in the event that the speed command value exceeds either a positive or negative first setting speed, and the speed detection value exceeds a second setting speed of a polarity opposite to that of the speed command value.

2. The door drive control apparatus according to claim 1, further comprising:
    a speed controller that calculates a current command value in such a way that the speed detection value matches the speed command value, and
    a current controller that generates a voltage command value of the power converter, using the current command value, an output current detection value of the power converter, and a position detection value of the door.

3. The door drive control apparatus according to claim 2, wherein the speed trouble signal is input into the current controller.

4. A door drive control apparatus comprising:
    a power converter configured to supply power to a door drive motor;
    a control circuit configured to operate the power converter by feedback control using a speed detection value and a speed command value of a door, and to control a speed of the door driven by the motor;
    an acceleration calculator that calculates an acceleration of the door using the speed detection value; and
    a trouble determiner that predicts the speed of the door after a predetermined time, from an acceleration detection value output from the acceleration calculator and the speed detection value and, in the event that the predicted speed exceeds either a positive or negative third setting speed, outputs a predicted speed trouble signal,
    wherein the trouble determiner is configured to operate for a certain time only after the door starts an operation, and does not operate after the certain time elapses.

5. The door drive control apparatus according to claim 4, further comprising:
    a speed controller that calculates a current command value in such a way that the speed detection value matches the speed command value; and
    a current controller that generates a voltage command value of the power converter, using the current command value, an output current detection value of the power converter, and a position detection value of the door.

6. The door drive control apparatus according to claim 5, wherein the predicted speed trouble signal is input into the current controller.

7. A door drive control method comprising:
operating a power converter, which supplies power to a door drive motor, by feedback control using a speed detection value and a speed command value of a door;
executing a trouble detection operation, including determining that the door is moving in a direction opposite to a movement direction according to the speed command value if the speed command value exceeds either a positive or negative first setting speed and the speed detection value also exceeds a second setting speed of a polarity opposite to that of the speed command value;
outputting a speed trouble signal according to a result of the trouble detection operation;
controlling an operation of the power converter using the speed trouble signal; and
controlling a speed of the door driven by the motor.

8. The door drive control method according to claim 7, further comprising: when the speed trouble signal is outputted, making an output voltage of the power converter zero for a certain period, and causing the motor to put a brake on a power generation.

9. The door drive control method according to claim 7, further comprising: executing the trouble detection operation for a certain time only after the door starts an operation, but not executing the trouble detection operation after the certain time elapses.

10. The door drive control method according to claim 7, further comprising: executing the trouble detection operation for a certain time only after the door starts an operation, but not executing the trouble detection operation after the certain time elapses, in the event that a difference between the speed command value and the speed detection value is no more than a threshold value.

11. A door drive control method comprising:
operating a power converter, which supplies power to a door drive motor, by feedback control using a speed detection value and a speed command value of a door;
calculating an acceleration detection value from the speed detection value;
executing a trouble detection operation, including predicting from the acceleration detection value a speed of the door after a predetermined time, and if the predicted speed exceeds either a positive or negative third setting speed, determining that there is trouble;
wherein the trouble detection operation is executed for a certain time only after the door starts an operation, and the trouble detection operation is not executed after the certain time elapses;
outputting a speed trouble signal according to a result of the trouble detection operation;
controlling an operation of the power converter using the speed trouble signal; and
controlling the speed of the door driven by the motor.

12. The door drive control method according to claim 11, further comprising: when the speed trouble signal is outputted, making an output voltage of the power converter zero for a certain period, and causing the motor to put a brake on a power generation.

13. The door drive control method according to claim 11, wherein: the trouble detection operation is executed for a certain time only after the door starts an operation and not executed after the certain time elapses only in the event that a difference between the speed command value and the speed detection value is no more than a threshold value.

14. A door drive control method comprising:
operating a power converter, which supplies power to a door drive motor, by feedback control using a speed detection value and a speed command value of a door;
selecting one of a first and a second trouble detection operation, according to whether a time is a regular operation time or an inspection and servicing operations time;
executing the selected trouble detection operation;
outputting a speed trouble signal according to a result of the selected trouble detection operation;
controlling an operation of the power converter using the speed trouble signal; and
controlling a speed of the door driven by the motor;
the first trouble detection operation including determining that the door is moving in a direction opposite to a movement direction according to the speed command value, if the speed command value exceeds either a positive or negative first setting speed and the speed detection value also exceeds a second setting speed of a polarity opposite to that of the speed command value; and the second trouble detection operation including calculating an acceleration detection value from the speed detection value, predicting from the acceleration detection value the speed of the door after a predetermined time, and if the predicted speed exceeds either a positive or negative third setting speed, determining that there is trouble; wherein the second trouble detection operation is executed for a certain time only after the door starts an operation, and the second trouble detection operation is not executed after the certain time elapses.

* * * * *